US012251960B2

(12) United States Patent
Schacht et al.

(10) Patent No.: US 12,251,960 B2
(45) Date of Patent: Mar. 18, 2025

(54) COATED PANEL AND METHOD FOR MANUFACTURING SUCH PANEL

(71) Applicant: Unilin, BV, Wielsbeke (BE)

(72) Inventors: Benny Schacht, Vlamertinge (BE); Filip Tack, Oudenaarde (BE)

(73) Assignee: Unilin, BV, Wielsbeke (BE)

(*) Notice: Subject to any disclaimer, the term of this patent is extended or adjusted under 35 U.S.C. 154(b) by 0 days.

(21) Appl. No.: 18/301,304

(22) Filed: Apr. 17, 2023

(65) Prior Publication Data

US 2023/0256774 A1 Aug. 17, 2023

Related U.S. Application Data

(60) Continuation of application No. 17/345,156, filed on Jun. 11, 2021, now Pat. No. 11,654,712, which is a (Continued)

(30) Foreign Application Priority Data

Mar. 10, 2009 (BE) .................................. 2009/0141
Apr. 21, 2009 (BE) .................................. 2009/0246

(51) Int. Cl.
*B44C 5/04* (2006.01)
*B05D 1/32* (2006.01)
(Continued)

(52) U.S. Cl.
CPC ................ *B44C 5/04* (2013.01); *B05D 1/322* (2013.01); *B05D 3/06* (2013.01); *B05D 3/12* (2013.01);
(Continued)

(58) Field of Classification Search
None
See application file for complete search history.

(56) References Cited

U.S. PATENT DOCUMENTS 1,971,067 A 8/1934 Fess
3,173,804 A 3/1965 Standfuss
(Continued)

FOREIGN PATENT DOCUMENTS

AT 402291 B 3/1997
CA 1237344 5/1988
(Continued)

OTHER PUBLICATIONS

Sabreen, "UV Color Inkjet Printing for Plastics: Technology Developments for Digital Applications", https://plasticsdecorating.com/articles/2007/uv-color-inkjet-printing-for-plastics-technology-developments-for-digital-applications/, Apr. 1, 2007.

*Primary Examiner* — Laura C Powers
(74) *Attorney, Agent, or Firm* — Capitol City TechLaw

(57) ABSTRACT

A method may be provided for manufacturing a panel that may include a substrate and a top layer provided on the substrate. The top layer may have a printed motif and a translucent or transparent synthetic material layer provided above the printed motif. The panel may have a structure or relief at the surface. The method may involve milling profiles into the substrate to obtain mechanical coupling means for coupling together two of the panels. The structure or relief and/or the printed motif may be realized after milling the profiles into the substrate.

16 Claims, 2 Drawing Sheets

Related U.S. Application Data continuation of application No. 16/005,165, filed on Jun. 11, 2018, now Pat. No. 11,059,320, which is a continuation of application No. 14/939,217, filed on Nov. 12, 2015, now Pat. No. 10,017,005, which is a division of application No. 13/133,875, filed as application No. PCT/IB2009/054968 on Nov. 9, 2009, now Pat. No. 9,216,610.

(60) Provisional application No. 61/139,286, filed on Dec. 19, 2008.

(51) Int. Cl.

| | |
|---|---|
| ***B05D 3/06*** | (2006.01) |
| ***B05D 3/12*** | (2006.01) |
| ***B05D 5/02*** | (2006.01) |
| ***B05D 5/06*** | (2006.01) |
| ***B05D 7/06*** | (2006.01) |
| ***B41F 17/00*** | (2006.01) |
| ***B44C 1/10*** | (2006.01) |
| ***B44C 1/20*** | (2006.01) |
| ***B44C 1/22*** | (2006.01) |
| ***B44F 9/02*** | (2006.01) |
| ***B44F 9/04*** | (2006.01) |
| ***E04F 13/08*** | (2006.01) |
| ***E04F 15/02*** | (2006.01) |
| *B05D 1/26* | (2006.01) |
| *B05D 5/00* | (2006.01) |

(52) U.S. Cl.

CPC ............... *B05D 5/02* (2013.01); *B05D 5/065* (2013.01); *B05D 7/06* (2013.01); *B41F 17/00* (2013.01); *B44C 1/10* (2013.01); *B44C 1/20* (2013.01); *B44C 1/22* (2013.01); *B44C 5/043* (2013.01); *B44C 5/0453* (2013.01); *B44F 9/02* (2013.01); *B44F 9/04* (2013.01); *E04F 13/08* (2013.01); *E04F 15/02* (2013.01); *E04F 15/02033* (2013.01); *B05D 1/26* (2013.01); *B05D 5/00* (2013.01); *Y10T 428/24884* (2015.01)

(56) References Cited

U.S. PATENT DOCUMENTS

| | | | | |
|---|---|---|---|---|
| 3,293,094 | A | 12/1966 | Nairn et al. | |
| 3,399,106 | A | 8/1968 | Palmer et al. | |
| 3,434,861 | A | 3/1969 | Luc | |
| 3,554,827 | A | 1/1971 | Yamagishi | |
| 3,574,659 | A | 4/1971 | Kwart et al. | |
| 3,674,611 | A | 7/1972 | Petry et al. | |
| 3,810,774 | A | 5/1974 | Pittman | |
| 3,811,915 | A | 5/1974 | Burrell et al. | |
| 3,905,849 | A | 9/1975 | Bomboire | |
| 4,050,409 | A | 9/1977 | Duchenaud et al. | |
| 4,097,635 | A | 6/1978 | Sanz Hernandez et al. | |
| 4,233,343 | A | 11/1980 | Barker et al. | |
| 4,298,646 | A | 11/1981 | Haemer et al. | |
| 4,312,686 | A | 1/1982 | Smith et al. | |
| 4,396,566 | A | 8/1983 | Brinkmann et al. | |
| 4,397,896 | A | 8/1983 | Moran | |
| 4,426,820 | A | 1/1984 | Terbrack et al. | |
| 5,082,495 | A | 1/1992 | Ijima | |
| 5,112,671 | A | 5/1992 | Diamond et al. | |
| 5,516,472 | A | 5/1996 | Laver | |
| 5,763,048 | A | 6/1998 | Takahashi | |
| 5,836,128 | A | 11/1998 | Groh et al. | |
| 5,863,632 | A | 1/1999 | Bisker | |
| 5,916,662 | A | 6/1999 | Schmidt | |
| 5,988,503 | A | 11/1999 | Kuo | |
| 6,006,486 | A | 12/1999 | Moriau et al. | |
| 6,345,481 | B1 | 2/2002 | Nelson | |
| 6,444,018 | B1 | 9/2002 | King et al. | |
| 6,465,046 | B1 * | 10/2002 | Hansson ................. | E04F 13/16 427/256 |
| 6,477,948 | B1 | 11/2002 | Nissing et al. | |
| 6,979,487 | B2 | 12/2005 | Scarbrough et al. | |
| 6,991,830 | B1 | 1/2006 | Hansson et al. | |
| 7,243,469 | B2 | 7/2007 | Miller et al. | |
| 8,465,804 | B2 | 6/2013 | Provoost et al. | |
| 9,266,382 | B2 | 2/2016 | Schacht et al. | |
| 2001/0022607 | A1 | 9/2001 | Takahashi et al. | |
| 2001/0027217 | A1 | 10/2001 | Jaetsch et al. | |
| 2002/0114927 | A1 | 8/2002 | Brossman et al. | |
| 2002/0136862 | A1 | 9/2002 | Dong et al. | |
| 2002/0142106 | A1 | 10/2002 | Bethune et al. | |
| 2003/0138618 | A1 | 7/2003 | Courtoy et al. | |
| 2003/0159385 | A1 | 8/2003 | Thiers | |
| 2003/0207083 | A1 | 11/2003 | Hansson et al. | |
| 2004/0026017 | A1 | 2/2004 | Taylor et al. | |
| 2004/0086678 | A1 | 5/2004 | Chen et al. | |
| 2004/0102120 | A1 | 5/2004 | Plusquellec et al. | |
| 2004/0146695 | A1 | 7/2004 | Hardwick | |
| 2004/0146806 | A1 | 7/2004 | Roberts et al. | |
| 2004/0161588 | A1 | 8/2004 | Mauk et al. | |
| 2004/0191547 | A1 | 9/2004 | Oldorff | |
| 2004/0221529 | A1 | 11/2004 | Zornes | |
| 2005/0153243 | A1 | 7/2005 | Rundle et al. | |
| 2005/0221056 | A1 | 10/2005 | Schwonke et al. | |
| 2005/0249923 | A1 | 11/2005 | Reichwein et al. | |
| 2005/0281986 | A1 * | 12/2005 | Nam ....................... | B32B 27/00 428/60 |
| 2006/0130421 | A1 | 6/2006 | Nollet et al. | |
| 2006/0188757 | A1 | 8/2006 | Magnusson | |
| 2006/0204773 | A1 | 9/2006 | Kwon et al. | |
| 2006/0280870 | A1 | 12/2006 | Halot et al. | |
| 2007/0084368 | A1 | 4/2007 | Vest et al. | |
| 2007/0283648 | A1 | 12/2007 | Chen | |
| 2008/0011167 | A1 | 1/2008 | Prager et al. | |
| 2008/0138560 | A1 | 6/2008 | Windmoller | |
| 2008/0172856 | A1 | 7/2008 | Brouckaert et al. | |
| 2008/0311355 | A1 | 12/2008 | Chen et al. | |
| 2014/0033635 | A1 | 2/2014 | Pervan et al. | |

FOREIGN PATENT DOCUMENTS

| | | | |
|---|---|---|---|
| CN | 86106829 | A | 5/1987 |
| CN | 1119152 | A | 3/1996 |
| CN | 2301491 | Y | 12/1998 |
| CN | 2364121 | Y | 2/2000 |
| CN | 1425098 | A | 6/2003 |
| CN | 1955234 | A | 5/2007 |
| CN | 101072691 | A | 11/2007 |
| CN | 101084125 | A | 12/2007 |
| DE | 1534802 | | 4/1970 |
| DE | 2326518 | | 3/1974 |
| DE | 2623661 | A1 | 2/1977 |
| DE | 2721292 | A1 | 11/1978 |
| DE | 2856391 | A1 | 7/1980 |
| DE | 19532819 | A1 | 3/1997 |
| DE | 19725829 | C1 | 8/1998 |
| DE | 202008008597 | U1 | 8/2008 |
| EP | 0007230 | A2 | 1/1980 |
| EP | 0043062 | A2 | 1/1982 |
| EP | 0123252 | A1 | 10/1984 |
| EP | 0130559 | A2 | 1/1985 |
| EP | 0562402 | A1 | 9/1993 |
| EP | 1138467 | A1 | 10/2001 |
| EP | 1236556 | A1 | 9/2002 |
| EP | 1872959 | A1 | 1/2008 |
| FR | 2827529 | A1 | 1/2003 |
| GB | 900958 | | 7/1962 |
| GB | 1015701 | A | 1/1966 |
| GB | 1467899 | A | 3/1977 |
| GB | 1520964 | | 8/1978 |
| GB | 2020998 | A | 11/1979 |
| GB | 2145371 | A | 3/1985 |
| JP | 49029950 | | 8/1974 |
| JP | 54155254 | | 12/1979 |
| JP | 60-255843 | | 12/1985 |
| JP | 62-127225 | | 6/1987 |

(56) References Cited

FOREIGN PATENT DOCUMENTS

| | | | |
|---|---|---|---|
| JP | 3-169967 | | 7/1991 |
| JP | 6-64108 | | 3/1994 |
| JP | 7-180333 | | 7/1995 |
| JP | 2000-170361 | | 6/2000 |
| KR | 1996-0005785 | | 1/1999 |
| WO | 9511333 | | 4/1995 |
| WO | 1995028291 | A1 | 10/1995 |
| WO | 9627721 | | 9/1996 |
| WO | 9718949 | | 5/1997 |
| WO | 9747834 | A1 | 12/1997 |
| WO | 9917930 | | 4/1999 |
| WO | 9945060 | A1 | 9/1999 |
| WO | 0047841 | | 8/2000 |
| WO | 0147724 | A1 | 7/2001 |
| WO | 0147725 | A1 | 7/2001 |
| WO | 0148333 | A1 | 7/2001 |
| WO | 0183488 | A1 | 11/2001 |
| WO | 0204206 | A1 | 1/2002 |
| WO | 2004042168 | A1 | 5/2004 |
| WO | 2005033204 | A1 | 4/2005 |
| WO | 2006033706 | A1 | 3/2006 |
| WO | 2006066776 | A2 | 6/2006 |
| WO | 2006090287 | A1 | 8/2006 |
| WO | 2007059967 | A1 | 5/2007 |

* cited by examiner

COATED PANEL AND METHOD FOR MANUFACTURING SUCH PANEL

This application is a continuation application of U.S. patent application Ser. No. 17/345,156 filed Jun. 11, 2021, which is a continuation application of U.S. patent application Ser. No. 16/005,165 filed Jun. 11, 2018 (issued as U.S. Pat. No. 11,059,320), which is a continuation application of U.S. patent application Ser. No. 14/939,217 filed Nov. 12, 2015 (issued as U.S. Pat. No. 10,017,005), which is a divisional application of U.S. patent application Ser. No. 13/133,875 filed Jun. 9, 2011 (issued as U.S. Pat. No. 9,216,610), which is a US National Phase Application of International Application PCT/IB2009/054968 filed Nov. 9, 2009, which claims priority under 35 USC 119(e) to U.S. Provisional Application No. 61/139,286 filed on Dec. 19, 2008, the entire content of all six of which are incorporated herein by reference.

This application claims priority under 35 USC § 119(a)-(d) to Belgian Patent Application Nos. 2009/0141 filed Mar. 10, 2009, and 2009/0246 filed Apr. 21, 2009, the entire content of both of which are incorporated herein by reference.

BACKGROUND

1. Field

This application relates to a coated panel and to a method for manufacturing such panel.

More particularly, the invention relates to panels of the type comprising at least a substrate and a top layer with a motif, said top layer being provided on said substrate. Herein, this may relate, for example, to furniture panels, ceiling panels, floor panels or the like, which substantially consist of a MDF or HDF (Medium or High Density Fiberboard) basic panel or substrate and a top layer provided thereon. In particular, it relates to panels which comprise one or more material layers provided on the substrate, wherein at least one of these material layers shows a printed motif. Preferably, herein this relates to a motif which is at least partially obtained by means of a print performed directly or indirectly on the substrate. However, the invention also applies to panels wherein the motif is realized in another manner, for example, by printing this motif on a carrier sheet and providing this carrier sheet on the aforementioned substrate, such as it is the case, for example, with DPL (Direct Pressure Laminate) laminate panels.

2. Related Art

Panels with a printed motif formed on the substrate are known as such, for example, from U.S. Pat. Nos. 1,971,067, 3,173,804, 3,554,827, 3,811,915, WO 01/48333, WO 01/47724, US 2004/0026017, WO 2004/042168, EP 1 872 959, DE 197 25 829 C1 or DE 195 32 819 A1. From the aforementioned documents, it is known that the aforementioned material layers can comprise one or more priming layers, wherein these priming layers substantially extend underneath said print, and/or may comprise one or more finishing layers, which substantially extend above said motif. Such finishing layers may comprise, for example, transparent or translucent synthetic material layers, which form a protective layer above the, whether or not printed, motif and may comprise, for example, wear-resistant particles, such as aluminum oxide. From WO 01/48333, panels are known, the protective layer of which is composed of UV-hardening or electron beam-hardening lacquer. Additionally, such lacquer layer may be provided with hard particles. As an alternative for a lacquer layer, document WO 01/48333 describes a protective layer, which comprises a material sheet, such as a paper sheet, and which is impregnated with thermohardening resin. Thermohardening resin may result in a harder protective layer than lacquer and thereby may result in a coated panel with a better wear resistance. Moreover, the material and curing of a lacquer layer is expansive, and providing a structure in the surface of such lacquer layer is cumbersome. The material sheet applied in the case of thermohardening resin has a negative influence on the visibility of the motif. The use of a material sheet as such is expensive, too. A protective layer on the basis of thermohardening resin further also has the disadvantage that it may be cold to the touch and that it may result in ticking sounds when being walked on, when such panel is applied in a floor covering. Moreover, for the curing thereof, relatively much energy is required, and realizing deep structures or relief is quite delicate.

As a partial solution for the problem of visibility, it may be opted for the techniques known as such from DE 197 25 829 C1. From this document, namely, a coating material is known which comprises thermo-hardening resin and can be provided on the panel in liquid form. After drying, the coating material is solidified in a heated press device. According to DE 197 25 829 C1, use is made of cellulose fibers blended into the coating material. These fibers may be applied for enabling the provision of thicker layers of synthetic material, however, also result in a certain loss of visibility of the motif, or loss of transparency of the layer concerned. In such thicker synthetic material layer possibly a deeper structure may be provided.

It is also noted that thermo-hardening resins, such as melamine resins, in general show the disadvantage that they do not or hardly adhere to prints which are performed by means of UV inks. Such inks may be applied, for example, for manufacturing panels with a printed motif formed on the substrate.

From the aforementioned patent documents, also various methods are known for providing the surface of a coated panel with a structure. From the document WO 2004/042168, it is known to provide recesses in the substrate itself or in a priming layer and to perform a print in the form of a motif on this structured substrate. From WO 01/47725, U.S. Pat. Nos. 3,811,915 and 3,554,827, it is known to provide a lacquer-repellent agent on the printed motif, such that the afterwards provided thereon transparent lacquer layer solidifies selectively, such that a structure is formed on the final panel. From WO 01/48333 and DE 197 25 829 C1, it is known to provide impressions in a protective layer provided above the motif, with the assistance of a mold or press cylinder or press plate. From WO 01/47724, it is known to provide a transparent lacquer layer by means of an inkjet selectively above the motif and in this manner realize a structure, wherein the thus provided lacquer layer covers the motif only partially and a portion of the motif is not protected against wear.

In respect to flexibility and/or in respect to structures which can be realized, the herein above-mentioned techniques leave much to be desired. For example, it is possible realizing with these techniques, in a smooth manner, structures which correspond to the motif provided by the print, and/or realizing deep structures. Moreover, according to some of the known techniques, the motif partially remains unprotected against, for example, wear or moisture penetration. Transparency, too, leaves much to be desired.

SUMMARY

According to its various independent aspects, the present invention in particular aims at offering alternative coated panels of the above-mentioned type, which, according to various preferred embodiments thereof, can be performed smoother and/or more economical than the panels from the state of the art, and/or offer a remedy for one or more disadvantages of the panels and/or methods for manufacturing them of the state of the art.

To this aim, the invention, according to its first independent aspect, relates to a coated panel of the type comprising at least a substrate and a top layer with a printed motif, said top layer being provided on said substrate, wherein said top layer also comprises a translucent or transparent synthetic material layer, which is provided above said printed motif, with the characteristic that said top layer, and preferably at least said transparent or translucent synthetic material layer, comprises a foamable or foamed synthetic material.

In general, any foamable synthetic material can be applied. Such foamable synthetic material may be chosen, for example, from the series of polyvinyl chloride, polystyrene, polyethylene, polyurethane, polypropylene, acrylate, polyamide, polymethylmethacrylate (PMMA) and polyester. It is clear that the synthetic material concerned in the final panel does not necessarily have to be foamed, however, preferably this is the case indeed at least for a portion and still better for the major portion of this synthetic material.

According to a particular, specified embodiment, the invention also may be paraphrased as a coated panel of the type comprising at least a substrate and a top layer provided on this substrate, wherein said top layer comprises a motif printed directly or indirectly on the substrate, and comprises a transparent or translucent synthetic material layer which is provided above said printed motif, with the characteristic that said top layer, and preferably at least said translucent or transparent synthetic material layer, comprises at least polyvinyl chloride and preferably also comprises plasticizer. Herein, it is not necessary that at least said transparent or translucent synthetic material layer comprises said polyvinyl chloride. It may also be present exclusively in and/or underneath said printed motif.

The coated panels of the invention form an alternative for the panels of the state of the art. The synthetic materials mentioned in the above paraphrases of the invention can be acquired less expensive than lacquers, however, generally are more expensive than thermo-hardening resins. The synthetic materials concerned can be structured in various manners and can be applied for realizing relatively thick layers, which still remain sufficiently transparent. Hereby, then deep structures can be realized without having to deform or form the substrate. Said thick layers possibly even may be realized without having to apply material sheets or cellulose fibers. The inventors also found that it is possible to realize thin layers, which can be applied, for example, as a coating above a print. Moreover, the occurrence of ticking sounds can be reduced significantly. For curing such synthetic materials, simple techniques may be applied, which do not necessarily involve much energy. Moreover, in some cases, for example, in the case of polyvinyl chloride, the respective curing may be postponed and/or at least partially be undone, such that providing a relief or structure can be performed simpler and/or faster. The synthetic materials of the panels of the invention preferably allow an adherence with a print formed on the basis of UV inks, without having to take particular measures, such as applying primers. This is the case, for example, with polyvinyl chloride.

The coated panel of the invention preferably is obtained by means of a method wherein said foamable or foamed synthetic material or said polyvinyl chloride, which is provided on the substrate, remains for at least some time in a soft condition. This may be realized, for example, by a method with the characteristics of the further also mentioned second aspect of the invention. This may be achieved, for example, in that the synthetic material concerned is provided on the substrate in soft or liquid form, for example, by means of one or more rollers, jetting and/or spraying devices, spreading devices or the like. Preferably, an application technique is used which applies an excess amount of the synthetic material concerned, wherein the obtained layer, after being provided, is calandered or raked off, such that a desired amount is obtained. Possibly, the synthetic material concerned may be provided in a plurality of layers, preferably each time by means of any of the herein above-mentioned possible application techniques. Possibly, an intermediate hardening or gelling of the synthetic material of one or more previously provided layers may be applied. A panel which is obtained by means of a method wherein said foamable or foamed synthetic material or said polyvinyl chloride, which is provided on the substrate, remains in soft condition at least for a certain period of time, can be recognized, for example, in that the bond between the synthetic material layer and one or more adjacent layers and/or the substrate is obtained at least partially or entirely by means of the curing of the synthetic material itself and thus not by means of a separate glue connection. However, the coated panel of the invention may also be manufactured in other manners. For example, the top layer can be manufactured at least partially or entirely separate and can be provided on the substrate afterwards, for example, by adhering or gluing this top layer onto the substrate. In such case, however, a separate glue connection will be present.

Preferably, said printed motif relates to a motif which is obtained by performing, whether directly or indirectly, a print on said substrate. An indirect print may be obtained, for example, by printing on one or more priming layers already provided on the substrate. According to the invention, it is of course not excluded to work with a motif which is printed on a flexible material sheet, which material sheet then can be provided completely or partially on the substrate.

Preferably, said motif has been obtained by means of a print by means of an inkjet printer with one or more print heads. Preferably, for printing, use is made of UV inks. UV inks are more stable in respect to light than water-based inks. According to the invention, it is not excluded that printing techniques, such as offset printing or gravure printing, for example, by means of press cylinders, are applied.

Said synthetic material layer which comprises said foamable or foamed synthetic material and/or which comprises said polyvinyl chloride, preferably extends over the entire printed motif and/or over the entire surface of the substrate. In this manner, an effective protective layer may be obtained over the entire surface of the substrate, and/or a well covering priming layer may be obtained. In such protective layer then possibly also a relief or structure may be provided, which also may extend over the entire surface of the substrate. Preferably, also in the finally formed coated panel, said synthetic material layer extends over substantially the entire surface of the substrate. Thus, preferably, also material of this synthetic material layer remains present in possible deeper structural parts of the top layer. In the case that the synthetic material layer concerned forms a protective layer, in this manner a good protection of the motif can be obtained.

For the substrate of the coated panels of the invention, preferably use is made of a board-shaped substrate. This means that the substrate shows a limited resiliency, wherein this resiliency, for example, is comparable to that of wood or MDF/HDF. Preferably, use is made of a substrate comprising a wood-based material, such as MDF or HDF. This is of particular importance when a motif is used which is obtained by performing a print directly or indirectly on said substrate. Such wood-based material, and in particular MDF or HDF, can easily be provided with a flat grinded upper surface, such that possible unevennesses of the upper surface concerned do not interfere or interfere less with a structure or relief possibly realized at the upper surface. Also when no structure or relief is realized, such unevennesses may be inconvenient. In order to avoid such influences, priming layers comprising a filler material can be used, by which possible unevennesses at the upper surface of the substrate then can be filled. According to the invention, it is possible that one or more of said priming layers comprise said foamed or foamable synthetic material and/or comprise said polyvinyl chloride.

An additional advantage of such synthetic materials or polyvinyl chloride is that they, in the case of a print performed directly or indirectly on the substrate, at the same time may be applied as a filler, sealant and/or priming layer. Hereby, possibly a plurality or all of the material layers situated underneath the printed motif may be realized by means of these synthetic materials or polyvinyl chloride. A relatively thin layer, for example, of less than 0.4 millimeters and still better less than 0.2 millimeters, applied, may be sufficient herein. Moreover, substrates having relatively many unevennesses may be used, such as unsanded or hardly sanded MDF or HDF boards.

As aforementioned, preferably at least said transparent or translucent synthetic material layer comprises the respective foamable or foamed synthetic material and/or said polyvinyl chloride. Preferably, said transparent or translucent synthetic material layer substantially consists of such synthetic material. Such transparent or translucent synthetic material layer may be performed as a relatively thin layer or coating, for example, as a layer having a thickness of less than 0.4 millimeters or of even less than 0.2 millimeters.

According to a particular embodiment, one or more of the material layers, of which the top layer is composed, substantially consist of polyvinyl chloride and/or plasticizer. Herein, this may relate to one or more material layers forming a priming layer or a finishing layer. Thus, for example, it is possible that at least said transparent or translucent synthetic material layer substantially consists of polyvinyl chloride and/or plasticizer. According to another possibility, said motif is provided on the substrate by the intermediary of one or more priming layers, wherein at least one of said priming layers comprises polyvinyl chloride and/or plasticizer or substantially consists thereof. According to this possibility, possibly unsanded substrates can be used. Preferably, such priming layer also comprises pigment. By this, a basic color of the motif can be obtained. In such case, the respective priming layer preferably is situated directly underneath the printed motif. As aforementioned, such priming layer also may function as a filler and/or sealing layer of the underlying substrate. It is not excluded that the entire top layer, priming layers and finishing layers, substantially is composed of such synthetic material Preferably, at least said transparent or translucent synthetic material layer is free from material sheets, such as paper sheets, and/or substantially or completely free from cellulose fibers. By substantially, in this case is meant that the cellulose fibers do not have any considerable influence on the transparency of the synthetic material layer. Still better, the entire top layer is free from such material sheets, or substantially or completely free from cellulose fibers. According to the invention, in such case still a relatively thick top layer may be realized, in which possibly deep structures can be provided. For example, lowered edge regions may be realized on one or more edges of the panels, and/or structures or relief may be realized on the actual surface of the panels, which imitate the relief of natural products, such as wood or stone.

It is noted that the translucent or transparent synthetic material layer, which is situated above said motif, in this manner protects this motif against wear at least to a certain extent. In that case, it is possible that the synthetic material layer forms the surface of the final coated panel. However, it is also possible that further finishing layers are provided on the synthetic material layer concerned. For example, the transparent or translucent synthetic material layer may comprise a layer, situated at the surface, on the basis of lacquer, such as, for example, a layer on the basis of UV-hardening or electron beam-hardening lacquer. Such lacquer layer shows a good adherence with, for example, polyvinyl chloride. Preferably, such lacquer layer comprises hard particles, such as ceramic particles, with an average particle size of smaller than 200 micrometers. Preferably, said transparent or translucent synthetic material layer as such comprises additives which increase the wear resistance of the panel, such as such hard particles. Preferably, the additives situated in a possible superficial lacquer layer are adapted for increasing the scratch resistance of the coated panel. Such additives are, for example, hard particles, such as ceramic particles with an average particle size of smaller than 60 micrometer. According to the invention, the translucent or transparent synthetic material layer may also consist substantially or entirely of such lacquer layer, wherein the material layer comprising said foamable or foamed synthetic materials or polyvinyl chloride then preferably is present there underneath, for example, underneath a print.

Preferably, said top layer has a thickness of more than 0.2 millimeters and still better of more than 0.5 millimeters. Preferably, the thickness of the top layer is limited to a maximum of 3 millimeters. As already mentioned, it is possible that the material layer comprising the foamed or foamable synthetic material of the polyvinyl chloride is made relatively thin, for example, with a layer thickness of less than 0.2 millimeters. It is not excluded that the top layer substantially consists of one or more such material layers and a print.

Preferably, the top layer as such has a weight ranging between 100 and 400 grams per square meter, or still better ranging between 150 and 300 grams per square meter, wherein 250 grams is a good value.

When a synthetic material layer, such as a polyvinyl chloride layer, is combined with a wood-based substrate, such as a MDF or HDF substrate, preferably an adherence layer is provided between the respective synthetic material layer and the substrate. Such adherence layer may consist, for example, of a material sheet, which at one side is provided with an amino resin, such as melamine resin, and at the other side is provided with the respective synthetic material, for example, PVC, or may comprise such material sheet. Melamine resin is known for its good adherence to wood-based substrates, such as MDF or HDF. Possibly, the motif can be printed on this material sheet already beforehand, or this material sheet may be applied as a base for a print. As a material sheet, for example, a paper sheet, a glass fiber web or a textile layer may be used. Thus, it is clear that according to the invention preferably a separate layer is present between said foamed or foamable synthetic material layer, or polyvinyl chloride, and said substrate, wherein this separate layer provides the connection between the respective synthetic material and the substrate. As also mentioned above, the connection of the respective synthetic material and the separate layer preferably is achieved by solidifying the synthetic material itself and thus not by means of a separate glue connection.

Preferably, said top layer also comprises wax, such as polyethylene wax or montanester wax. The use of wax in the top layer leads to a reduced adherence effect of the panels when being manufactured. Moreover, by wax a higher gloss degree and/or a certain hydrophobic effect may be achieved.

In the cases where a plasticizer is applied, preferably a phthalate plasticizer or an isosorbide plasticizer is applied. In the case of phthalates preferably phthalates are used having relatively long side chains, such as DINP/DIDP. Isosorbide plasticizers form a more expensive, but more environmentally-friendly alternative for phthalate plasticizers. Isosorbide as such is known as a plasticizer, for example, from WO 99/45060 or WO 01/83488. Isosorbide further also has the advantages that it can lead to more transparent synthetic material layers than it is the case with phthalates, and that those may have a better resistance against heat. By using plasticizers, so-called soft PVC may be realized.

In general, by using plasticizers, the synthetic material concerned may be made softer. Hereby, for example, the also above-mentioned ticking sound may be avoided for the major part. Moreover, a soft synthetic material layer as such may lead to a better scratch resistance at the surface of the final panel. Also in the cases where a structure or a relief has to be realized at the surface of the panel, it is advantageous to apply plasticizers. More particularly, a situation can be obtained in which it is possible to provide this structure or relief by means of a heated press element, such as a press plate or press cylinder.

Preferably, the coated panel of the invention has a structure or relief at the surface. Such structure or relief can be realized according to several possibilities. Such structure or relief preferably corresponds to the printed motif.

According to a first possibility, such structure or relief consists at least partially of impressions provided in said transparent or translucent synthetic material layer. Such impressions may be realized, for example, by means of a heated press element, such as a press plate or press cylinder. In the panels of the invention, relatively deep structures can be achieved by applying said synthetic materials, without necessarily having to deform the substrate for this purpose. Namely, foamable and/or foamed synthetic materials or synthetic material layers on the basis of polyvinyl chloride as such can be realized thicker, without a considerable loss of transparency occurring. Preferably, said impressions are formed in the still soft or softened again synthetic material, as a result of which a higher deformability is obtained.

According to a second possibility, such structure or such relief comprises a pattern of recesses and/or projections, wherein this relief is at least partially obtained by locally increasing and/or decreasing the volume of said top layer. By "locally", it is meant that the entire top layer does not uniformly increase and/or decrease in volume. Herein, this may relate to very limited local variations in volume increase and/or decrease. For example, globally seen a uniform volume increase may be present at the surface of the top layer, whereas at the edges locally a lesser volume increase takes place, or even a volume decrease takes place, for forming lowered edges which may serve, for example, as an imitation of a joint, a chamfer or a sunken lacquer layer. According to another example, globally seen a uniform volume increase may be present at the surface of the top layer, whereas locally a lesser volume increase or a volume decrease takes place for forming recesses which imitate the presence of, for example, wood pores or other local unevennesses. Specifically, an expansion-preventing agent can be applied in the top layer. Such agent contains, for example, benzotriazole and/or tolyltriazole. Such product is able to diminish or to prevent the expansion of a synthetic material, such as PVC (polyvinyl chloride). As an expandable agent, an agent can be applied which as such contains PVC. Said local volume alterations then may be realized by locally applying and/or activating said volume expansion-preventing or expanding agent.

According to a third possibility, said substrate is made structured, and said material layers follow at least partially the relief of the substrate, such that a structure is obtained at the surface of the final panel. This possibility may be applied, for example, for realizing chamfers.

Preferably, said substrate has a thickness ranging between 5 and 15 millimeters and still better between 6 and 12 millimeters. Such thickness leaves sufficient space for realizing mechanical coupling means. However, the invention does not exclude that substrates with a thickness ranging from 2 to 5 millimeters may be applied. Preferably, said substrate is substantially or entirely free from polyvinyl chloride. Still better, said substrate is substantially or entirely free from any thermoplastic material. Preferably, the substrate which is employed in the method of the invention comprises organic components, such as wood, flax, bamboo and the like. Still better, the substrate consists for at least 60% of such organic components, such as this is the case with MDF or HDF.

The invention further also relates to a method for manufacturing panels. For example, the method concerned may be applied for manufacturing the above-described coated panels. To this aim, the invention, according to a second independent aspect, relates to a method for manufacturing a panel, wherein this panel is of the type comprising at least a substrate and a top layer provided on this substrate, with the characteristic that the method comprises at least the following steps:

- the step of preparing the substrate;
- the step of performing a print on the substrate;
- the step of applying a polyvinyl chloride paste on the substrate; and
- the step of gelling or otherwise foaming or solidifying said applied paste.

Said step of preparing the substrate may comprise various treatments. For example, this step may comprise applying one or more priming layers and/or structuring the substrate and/or bringing the substrate to size and/or grinding the substrate.

By "gelling or otherwise foaming or solidifying", in general the process of expansion of polyvinyl chloride paste to soft PVC is indicated. Herein, preferably at least an increase of the viscosity of the PVC paste is achieved. Preferably, such paste also contains plasticizer. Preferably, said polyvinyl chloride paste, apart from PVC powder, comprises 5 to 75 weight percent of plasticizer. Preferably, finally a coated panel is obtained in which at least one material layer substantially consists of soft PVC. Preferably, said polyvinyl chloride paste, apart from PVC powder, contains 3 to 15 weight percent of wax, for example, the also above-mentioned waxes. Said process may be performed in different steps, wherein each time heat is supplied to said paste. Preferably, the temperatures applied herein range from 40° C. to 200° C. From 40° C. on, already a certain expansion may occur; from 160° C., a complete expansion can be obtained.

It is clear that the steps mentioned here can be performed on larger substrates, from which the final coated panels then are formed, for example, by subdividing these larger substrates by a sawing machine, as well as on panels already showing approximately the dimensions of the final coated panels.

Preferably, said substrate, in the step of providing said polyvinyl chloride paste on the substrate, is in a condition in which it has a board or panel shape. This means that the substrate concerned is in a form in which it can not be wound up. Herein, the substrate shows a resiliency which is similar to that of wood or MDF/HDF.

Preferably, said substrate is substantially or entirely free from polyvinyl chloride. Still better, said substrate is substantially or entirely free from any thermoplastic material. Preferably, the substrate which is applied in the method of the invention comprises organic components, such as wood, flax, bamboo and the like. This may relate, for example, to a board-shaped substrate comprising one or more of said organic components in the form of fibers or particles, wherein the particles concerned are connected by means of a polycondensation glue, such as ureum formaldehyde resin and/or melamine formaldehyde resin. Such boards or substrates have the advantage that the curing or stability of the substrate is not or almost not affected by the gelling or hardening of said polyvinyl chloride. An example of such board material is MDF, HDF (Medium or High Density Fiberboard) or wood particleboard.

The particularity of the present invention is that the applied paste is gelled or otherwise foamed or hardened while being present on the substrate. Hereby, an intense bond with underlying material layers may be obtained, such as with the substrate itself. Moreover, in this manner the final thickness of the total panel can be kept better under control. Thereby, the risk can be minimized that variations in substrate thickness manifest themselves in the global or local thickness of the panel. It is noted that according to a deviating variant of this method and its preferred embodiments, also another foamable paste can be applied instead of polyvinyl chloride paste. For example, other foamable synthetic materials may be used, which are also mentioned in this introduction.

The method of the invention can be performed in various possible manners. Below, two important possibilities are discussed in more detail.

According to a first important possibility, said gelling, foaming and/or curing takes place on a porous substratum, such as directly on a MDF or HDF substrate. In this manner, a good adherence to the substrate can be achieved with the polyvinyl chloride. It is noted that due to the fact that gelling takes place on the substrate, MDF or HDF boards can be used which have not or almost not been ground. This offers a material gain and cost savings. It is clear that according to this first important possibility, at least a material layer can be formed which is situated underneath said print. Preferably, said gelling, foaming and/or curing takes place prior to having performed said print. However, it is not excluded that it would be performed afterwards. Preferably, the print is performed by means of UV inks. Those inks have the feature that they adhere well to PVC. It is clear that according to this first important possibility, said step of preparing the substrate comprises the step of applying said paste.

According to a second important possibility, said gelling, foaming and/or curing takes place on a substratum which comprises said print. In this case, this preferably relates to a print performed by means of UV inks. In this manner, a relatively thick top layer can be realized, which still is sufficiently transparent. It is clear that according to this second important possibility, at least a material layer can be formed which forms a finishing layer or protective layer above said print. Preferably, said gelling, foaming and/or curing takes place after said print already has been performed.

The above-mentioned first and second important possibility of course also may be combined, such that at least two layers of said PVC paste are gelled, cured or foamed on the substrate.

In the case that said polyvinyl chloride paste is applied in at least two layers, preferably a first of said two layers is at least partially gelled before a second of these layers is applied. Preferably, said first layer is gelled for at least 20% and still better for at least 40%, before the second layer is applied. This means that the first layer undergoes at least 20%, at least 40%, respectively, of the final total expansion. Still better, the gelling of the first layer is complete or almost complete, in other words, expanded for at least 85%, before the second layer is applied.

Preferably, a top layer is obtained with a thickness of more than 0.2 millimeters and still better of more than 0.5 millimeters. Preferably, the thickness of the top layer is limited to a maximum of 3 millimeters. It is possible that the material layer comprising the foamed or foamable synthetic material or the polyvinyl chloride is made relatively thin, for example, with a layer thickness of less than 0.2 millimeters. It is not excluded that the top layer substantially is composed of one or more of such material layers and a print.

Preferably, for realizing the top layer, from 100 to 400 grams per square meter of polyvinyl chloride are applied, or still better from 150 to 300 grams per square meter, wherein 250 grams is a good value. It is clear that these amounts possibly may be applied in several steps, wherein preferably each time a gelling is performed in between. Further, it is clear that the top layer also may comprise other materials.

Preferably, said substrate has a thickness ranging from 5 to 15 millimeters, and still better from 6 to 12 millimeters. In this manner, sufficiently rigid panels can be manufactured, at which, for example, mechanical coupling means can be provided.

Preferably, the method also comprises a step in which a structure is realized at the surface of said top layer. Preferably, this step is performed while said polyvinyl chloride still shows a certain softness or at least is not yet fully expanded or gelled. An alternative consists in that said polyvinyl chloride possibly indeed is totally expanded, however, at least partially is softened again for realizing said structure or relief. This latter may be, for example, by means of heat, which can be supplied to the panel or its top layer in any manner.

Said structure or relief can be realized according to various possibilities. Such structure or relief preferably shows a correspondence to said print.

According to a first possibility, for realizing at least a part of said structure, a press treatment is applied by means of a press element, such as a press cylinder or a press plate. Such press element may be heated, such that the aforementioned softening is realized at least partially by means of the press element itself.

According to a second possibility, for realizing at least a part of said structure, a selective gelling, curing, foaming or expansion of said polyvinyl chloride is applied.

According to a third possibility, for realizing at least a part of said structure, it is started from a structured substrate, or the step of preparing the substrate, in other words, at least comprises structuring the substrate.

It is clear that these three possibilities may result in coated panels showing the characteristics of the corresponding possibilities mentioned in the first aspect.

For a fast reaction to an order, and for excluding redundant supplies, it is advantageous to realize the structure and/or the motif as late as possible in the manufacture. In such case, they are preferably provided directly on panels already having approximately or completely the dimensions of the final coated panels. In that same case, the respective panels also can already be provided with possible edge finishes, such as milled coupling means or other profiled edge parts. Of course, it is not excluded that such profiled edge parts are provided later during manufacture. Providing structure or relief panel per panel has the advantage that the risk that this structure disappears, for example, in that it is milled away or sawed away or is removed in another manner, is considerably reduced, even when this relates, for example, to relatively restricted structures situated on the edge of the panel, such as chamfers with a depth of less than 1 millimeter.

Preferably, the position of the relief or the structure, according to all aspects of the invention, is referenced to a final edge or a final corner point of the coated panel, whether or not this edge still has to be obtained. This preferred embodiment can be performed in the most simple manner when the substrates already have the respective final edge or corner point; however, it is not excluded that, even if the substrates do not yet have this final edge or corner point, still an alignment is performed in respect to the final edge or corner point to be formed, for example, in that other reference means are provided, which adopt a position which refers to the respective final edge or corner point. For example, the present preferred embodiment allows obtaining symmetrical structures, such as tile imitations or floor part imitations with a two- or four-sided lowered edge, in a smooth manner, wherein then preferably the width of the lowered edge, at opposite sides of the coated panels, is performed equal or approximately equal.

According to a third independent aspect, the invention also relates to a coated panel of the type comprising at least a substrate and a top layer provided on this substrate, wherein said top layer comprises a motif printed directly or indirectly on the substrate, and a transparent or translucent synthetic material layer, which is provided above said printed motif, characterized in that said substrate is made waterproof. The use of a waterproof substrate allows realizing an economization in the production of such panels. Namely, priming layers and possibly ink may be economized. Due to the fact that the substrate is made waterproof, the use of a sealing layer may be omitted and a reduced absorption of the ink in the substrate may be obtained.

Preferably, said substrate is made waterproof at least in that this substrate comprises thermoplastic material or substantially consists hereof.

According to a first example, this may relate to a substrate which substantially or entirely consists of polyvinyl chloride or polyethylene; preferably, the material of the substrate has a high density, such as it is the case, for example, with high-density polyethylene (HDPE).

According to a second example, a substrate may be concerned which comprises so-called WPC (Wood Plastic Composite) material. Herein, this relates to a synthetic material-based material, which comprises wood particles or other material as a filling agent. Herein, said synthetic material-based material is chosen, for example, from the series of polyethylene, polyethylene terephthalate, polypropylene, polystyrene, polycarbonate, polyurethane and polyvinyl chloride. Such material is known, for example, from the document WO 2005/033204. It is noted that the weight ratio of synthetic material to filling agent may range between 70:30 and 20:80, whereas the ratio of binding agent to wood particles or wood fibers in MDF or HDF is considerably lower. Good values for MDF or HDF are, for example, between 2:98 and 12:88. In MDF/HDF, other materials are applied as a binding agent than the above-mentioned materials. Namely, in these use is made of, for example, ureum formaldehyde- and/or melamine formaldehyde- and/or isocyanate-containing agents.

Preferably, said substrate has a thickness in the range from 5 to 15 millimeters, and still better from 6 to 12 millimeters. Such thickness leaves sufficient space for realizing mechanical coupling means. However, the invention does not exclude that substrates with a thickness in the range from 2 to 5 millimeters may be applied.

According to a particular embodiment, said substrate as such determines at least partially the basic color of the printed motif. Preferably, in such case printing is performed directly on the substrate, without the intermediary of priming layers or other material layers.

Preferably, said printed motif is at least partially realized on the basis of UV inks. UV ink adheres well to waterproof materials, such as, for example, WPC, PVC or PET.

Of course, the material layers of the first aspect may be applied in the panels of the third aspect, or a method with the characteristics of the second aspect may be applied for manufacturing these panels.

According to a further, fourth independent aspect, the invention also relates to a method for treating material sheets, wherein these material sheets may be applied for manufacturing coated panels, characterized in that said material sheets are provided with polyvinyl chloride. Such material sheets, pressed on a substrate, may be applied as a backing layer, decor layer and/or so-called overlay in a laminate panel. Herein, similar effects may be obtained as in the first aspect of the invention. Preferably, similar substrates as mentioned there will be used.

In the case of an overlay, by means of said polyvinyl chloride a transparent or translucent layer is realized at the surface of the material sheet concerned.

In the case of a decor layer, said material sheets, preferably prior to providing them with polyvinyl chloride, are provided with a motif.

It is important to note that according to all aspects of the invention, relatively rigid panels are manufactured and no coverings which can be rolled up. Rigid panels have the advantage that they can easily be provided with connecting means, for example, screws, dowels, or mechanical coupling means allowing that two of such panels, for example, floor panels, can be coupled to each other, for example, by milling the profiles of such coupling means into said substrate. Such coupling means and milling techniques are known as such from WO 97/47834 or DE 20 2008 008 597 U1. Due to their rigidity and the presence of coupling means, the manufactured coated panels are simple to install and require no gluing to the underlying layer.

BRIEF DESCRIPTION OF THE DRAWINGS

With the intention of better showing the characteristics of the invention, hereafter, as an example without any limitative character, some preferred embodiments are described, with reference to the accompanying drawings, wherein.

DESCRIPTION OF NON-LIMITING EMBODIMENTS

Figure 1:
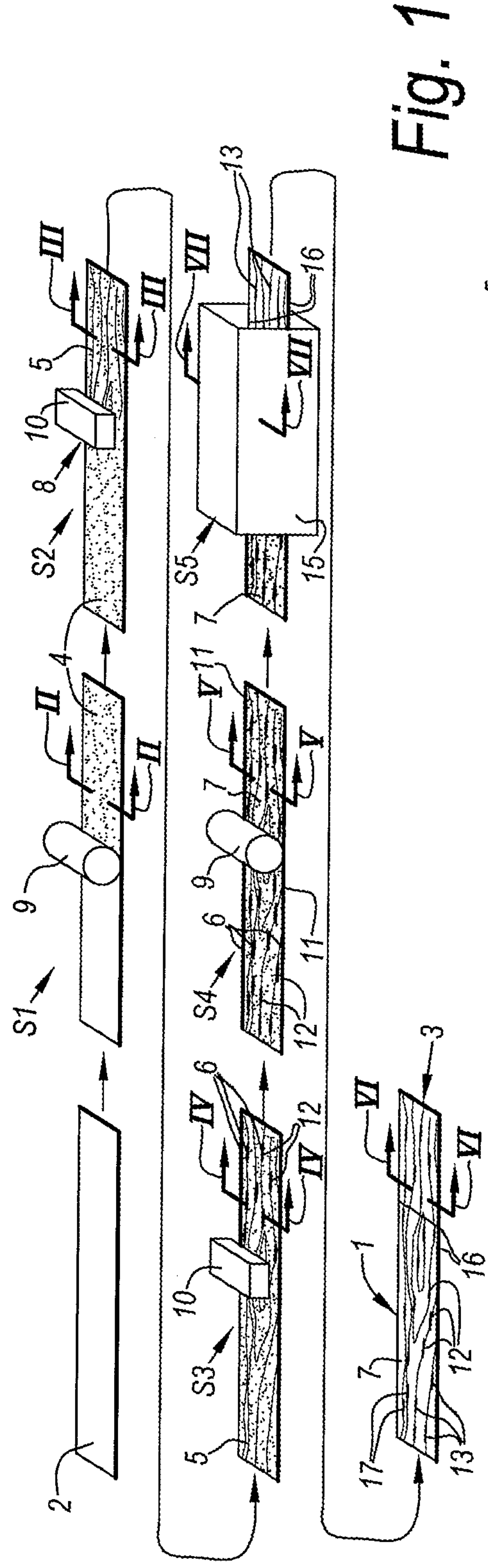
FIG. 1 schematically represents some steps in a method with the characteristics of the invention.

FIG. 1 schematically represents some steps S1-S5 in a method for manufacturing coated panels 1. The respective coated panels 1 are of the type comprising at least a substrate 2, for example, a MDF or HDF basic panel, and a top layer 3 provided on this substrate 2. In the example, the top layer 3 is composed of a plurality of material layers 4-7, amongst which a material layer 5, which shows a motif and which, during step S2, is provided in the form of a print 8 performed directly on the substrate 2.

In a previous step S1, one or more priming layers 4 are provided on the surface of the substrate 2 to be printed with the motif. These may have the purpose of providing a smooth subsurface and/or providing a uniform or quasi-uniform background color and/or an adhering undercoat for material layers 5-8 to be applied later, such as for the material layer 5 with the motif, or for the synthetic material layer 7. As mentioned in the introduction, all these functions possibly may be fulfilled by a material layer which comprises polyvinyl chloride and/or plasticizer.

Figure 2:
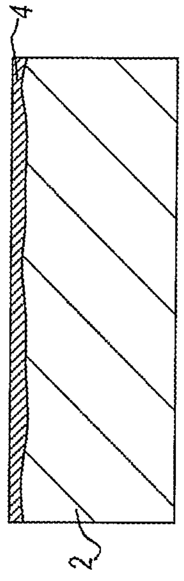
FIG. 2, at a larger scale, represents a cross-section according to the line II-II indicated in FIG. 1.

FIG. 2 represents the result of step S1 and shows that a possibly uneven surface of the substrate 2 can be made flat or approximately flat by means of said one or more priming layers 4.

In the example, in step S1 use is made of an application technique by means of one or more cylinders 9. It is clear that in step S1 of FIG. 1, also other application techniques may be applied for realizing one or more priming layers 4. At the same time, it is clear that it is not necessary for the invention that such priming layers 4 are applied, although this may be important for the quality of the motif. Instead of working with a priming layer 4 which is applied in liquid form, use may also be made of a priming layer 4 comprising a material sheet, such as a paper sheet, and which is provided on the substrate 2 in dry or quasi-dry form. In the case of a polyvinyl chloride paste, this paste preferably is at least partially gelled while already having been provided on the substrate.

As aforementioned, in step S2 of FIG. 1 a motif is realized by means of a print 8 which is performed directly on the substrate 2 or, in this case, on a priming layer 4 already provided on the substrate 2. The obtained motif relates to a wood motif extending over the entire length of the oblong rectangular panel 1. Of course, the invention is not restricted to such motifs. Preferably, such print is performed by means of UV inks.

In this case, for providing the printed motif use is made of an inkjet printer 10 with one or more heads. For example, use can be made of the techniques and devices which are known as such from EP 1 872 959, wherein, for example, such a battery of inkjet print heads is arranged one after the other and next to each other that the entire surface of the panel 1 can be covered by means of a multi-color print. According to another example, use can be made of a so-called multi-pass inkjet printer, wherein the inkjet print heads move to and fro over the substrate. It is evident that the present invention for step S2 neither is restricted to inkjet printing techniques, nor to motifs printed directly on the substrate 2.

Figure 3:
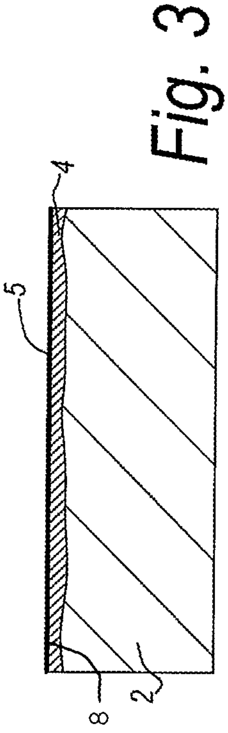
FIGS. 3 to 6, at the same scale, represent cross-sections, respectively according to the lines III-Ill, IV-IV, V-V, VI-VI indicated in FIG. 1.

FIG. 3 represents the result of the print 8 performed indirectly on the substrate 2, in this case on a priming layer 4 already situated on the substrate 2. As noted above, the print 8 results in the material layer 5, which shows the motif.

In step S3 of FIG. 1, an additional print 6 is provided above the printed motif. This relates to a print 6 with an expansion-preventing agent. The print 6 is performed with a pattern which will determine the final structure of the relief of the coated panel 1. Herein, the pattern covers only particular locations in the printed pattern and thus preferably does not extend over the entire surface of the final coated panel 1. In this case, the pattern forms a mask which provides the edges 11 of the panel 1 as well as certain locations 12 in the surface of the panel 1 with such expansion-preventing agent. Herein, the locations 12 in the surface of the panel 1 correspond to wood flowers or wood nerves present in the wood motif and will lead to recesses present in the panel 1, which imitate wood pores.

Figure 4:
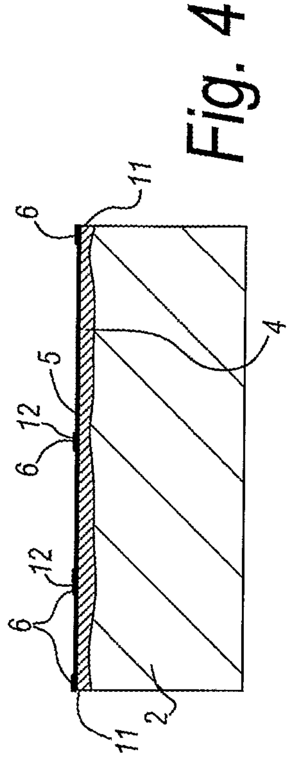

FIG. 4 once again clearly shows the locations 11-12 of the print 6 provided in step S3.

In step S3, it is represented that the print 6, which determines the relief or the structure, is provided by means of a digital printing technique, such as by means of an inkjet printer 10. It is clear that it is not excluded that the print 6 or the expansion-preventing agent can be applied in another manner.

In step S4 of FIG. 1, a synthetic material layer 7 is applied. Such synthetic material layer 7 preferably consists of a transparent or translucent matter and preferably extends over the entire panel 1 concerned. In this case, use is made of a foamable synthetic material, more particularly polyvinyl chloride with plasticizer. In the example, a cylinder 9 is shown for applying such layer. However, it is clear that this synthetic material layer 7 can be provided in any manner. It is also possible that in step S4 a plurality of synthetic material layers 7 situated one above the other are applied, whether or not of the same kind. Preferably, also hard wear-resistant particles are provided in the synthetic material layer 7. For example, they may be blended or woven into the synthetic material or into the synthetic material layer 7 beforehand or can be strewn into the already provided synthetic material layer 7 or deposited in another manner.

Figure 5:
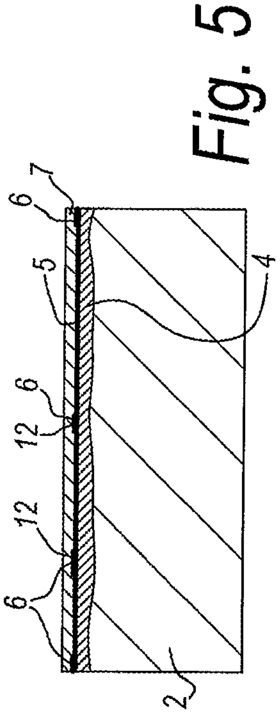

FIG. 5 shows the result obtained after step S4.

In step S5 of FIG. 1, a relief is provided at the surface of the synthetic material layer 7 applied in step S4.

Figure 6:
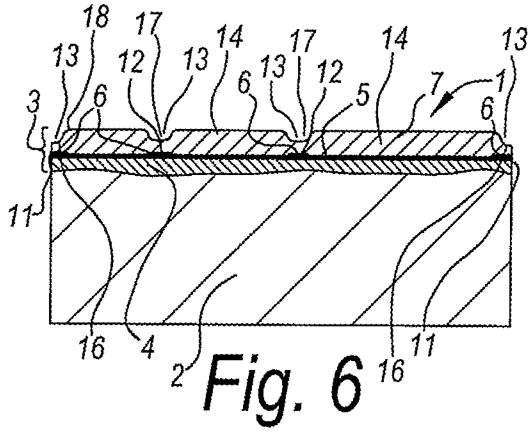

FIG. 6 represents that herein, a coated panel 1 is obtained which shows a pattern of recesses 13 and projections 14 at its surface, wherein this pattern is at least partially determined by means of the print 6 with expansion-preventing agent applied in step S3. This structure is obtained in that the synthetic material layer 7 is activated in step S5 and starts to expand, or in other words will foam or gel. This activation may be obtained, for example, by heating the synthetic material layer 7 by means of a hot-air oven 15 or an infrared oven.

FIG. 6 shows that at the places where in step S3 expansion-preventing or expansion-reducing agent is applied, said expansion has occurred to a lesser extent or not at all. At those places, there are recesses 13 in the surface of the thickened synthetic material layer 7. In this way, in the example chamfers 16 have been obtained at the edges 11 of the coated panel 1, and recesses 13 have been obtained in the surface of the panel 1 for imitating wood pores 17. It is evident that the technique of the invention may also be applied for obtaining chamfers 16 only or obtaining imitations of wood pores 17 only or for obtaining other structures.

FIG. 6 also shows that the obtained recesses 13 may have a structure with strong rounded portions 18.

Figure 7:
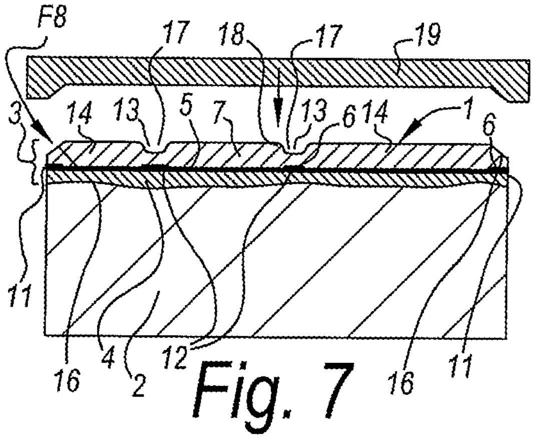
FIG. 7, at the same scale, but for a variant, represents a cross-section according to the line VII-VII indicated in FIG. 1.

FIG. 7 shows a possibility for obtaining sharper structures. Herein, when expanding the synthetic material layer 7, in step S5 a forming mold 19 can be applied, against which the expanding synthetic material layer 7 is rising. Such technique may be interesting for forming sharper chamfers 16. In the represented example, the forming mold 19 is a substantially flat press element. However, it may also be worked with one or more press cylinders or molding wheels.

It is clear that herein, an embodiment is obtained wherein the first and second possibility for forming structure or relief at the surface of the coated panels, mentioned in the introduction, are combined.

Figure 8:
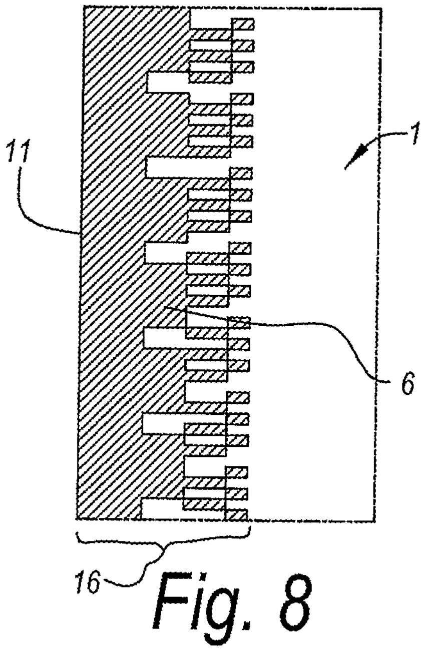
FIG. 8 for a variant represents a view according to the direction F8 indicated in FIG. 7.

FIG. 8 represents another possibility for obtaining sharper structures, such as sharp chamfers 16. Herein, the aforementioned one or more prints 6, which determine the structure, are performed with a so-called degrade, wherein the intensity or the amount of applied agent of the print 6 is varied according to the depth one wishes to obtain at that place. It is evident that this printing technique may or may not be combined with the technique represented in FIG. 7.

Applying such degrade also has advantages in all aspects where the relief is at least partially determined by means of a preferably digital print.

It is clear that the method of FIGS. 1 to 6 and the variants of FIGS. 7 and 8 form examples of said first and second aspect, as well as that the obtained coated panels form examples of said first aspect.

It is clear that the results of the methods according to the invention depicted in FIGS. 6 and 7 can be finished even further with one or more finishing layers, such as lacquer layers and the like.

It is noted that the thickness of the material layers and substrates represented in FIGS. 2 to 7 is represented only schematically and does not comprise any restrictions. However, it is clear that the thickness of the top layer can be restricted to several tenths of millimeters, whereas the thickness of the substrate may vary from 5 to 15 millimeters, or thicker.

The present invention is in no way limited to the embodiments described above; on the contrary may such methods and panels be realized according to various variants, without leaving the scope of the present invention.

What is claimed is:

1. A method for manufacturing a panel, the method comprising:

providing a substrate with a top layer provided on the substrate, the top layer having a printed motif and a translucent or transparent synthetic material layer provided above the printed motif, the translucent or transparent synthetic material layer having a surface with a structure or relief;

milling profiles into the substrate to obtain mechanical coupling means for coupling together two of the panels;

realizing the structure or relief and/or the printed motif after milling the profiles into the substrate;

wherein the translucent or transparent synthetic material layer includes a foamable synthetic material;

foaming the foamable synthetic material; and providing an additional print with an expansion prevention agent that determines location of recesses in the structure or relief.

2. The method according to claim 1, wherein the translucent or transparent synthetic material layer includes a finishing layer on the basis of a UV-hardening or electron beam-hardening lacquer.

3. The method according to claim 1, wherein the printed motif is printed using an inkjet printer.

4. The method according to claim 3, wherein the printed motif is printed using UV inks.

5. The method according to claim 1, wherein the top layer further comprises one or more priming layers between the substrate and the printed motif.

6. The method according to claim 1, wherein the substrate is a waterproof substrate comprised of thermoplastic material.

7. The method according to claim 1, wherein the substrate substantially or entirely consists of polyvinylchloride.

8. The method according to claim 1, wherein the transparent or translucent synthetic material layer is free from material sheets and/or substantially free from cellulose fibers.

9. The method according to claim 1, wherein the entire top layer is free from material sheets or substantially free from cellulose fibers.

10. The method according to claim 1, wherein the panel is a floor panel.

11. The method according to claim 1, wherein the translucent or transparent synthetic material layer is chosen from the series of polyvinyl chloride, polystyrene, polyethylene, polyurethane, polypropylene, acrylate, polyamide, polymethylmethacrylate (PMMA) and polyester.

12. The method according to claim 1, wherein the top layer comprises polyvinylchloride.

13. The method according to claim 1, wherein the substrate has a thickness ranging between 5 and 15 millimeters.

14. The method according to claim 1, wherein the substrate has a thickness ranging from 2 to 5 millimeters.

15. The method according to claim 1, wherein the structure or relief corresponds to the printed motif.

16. The method according to claim 1, wherein the structure or relief comprises an imitation of a joint or of a chamfer.

* * * * *